United States Patent
Koch et al.

(10) Patent No.: US 9,551,371 B2
(45) Date of Patent: Jan. 24, 2017

(54) LOAD FLOOR SCREW PLATE (LFSP) USED TO DISTRIBUTE HINGE AND BRACKET LOADS TO THE LOAD FLOOR PANELS

(71) Applicant: GRUPO ANTOLÍN-IRAUSA, S.A., Burgos (ES)

(72) Inventors: Gregory D. Koch, St. Clair Shores, MI (US); Brian B. Bradley, Rochester Hills, MI (US); James L. Chesney, Howell, MI (US)

(73) Assignee: GRUPO ANTOLÍN-IRAUSA, S.A., Burgos (ES)

( * ) Notice: Subject to any disclaimer, the term of this patent is extended or adjusted under 35 U.S.C. 154(b) by 211 days.

(21) Appl. No.: 14/532,400

(22) Filed: Nov. 4, 2014

(65) Prior Publication Data
US 2015/0147135 A1 May 28, 2015

Related U.S. Application Data

(60) Provisional application No. 61/909,514, filed on Nov. 27, 2013.

(51) Int. Cl.
*F16B 37/04* (2006.01)
*F16B 15/00* (2006.01)
*F16B 37/02* (2006.01)

(52) U.S. Cl.
CPC ......... *F16B 15/003* (2013.01); *F16B 15/0046* (2013.01); *F16B 37/02* (2013.01); *F16B 37/048* (2013.01)

(58) Field of Classification Search
CPC ... F16B 15/003; F16B 15/0046; F16B 37/048; F16B 37/02
USPC .............................................. 411/179; 52/698
See application file for complete search history.

(56) References Cited

U.S. PATENT DOCUMENTS

| | | | | |
|---|---|---|---|---|
| 2,873,496 A * | 2/1959 | Elms | ...................... | F16B 5/0291 403/260 |
| 3,449,997 A * | 6/1969 | Couch | ...................... | E04B 1/49 403/279 |
| 3,667,337 A * | 6/1972 | Burke | .................. | F16B 15/0046 411/467 |
| 4,198,175 A * | 4/1980 | Knepp | ................ | F16B 15/0046 403/191 |
| 4,679,367 A * | 7/1987 | Geisthardt | ................. | E04B 1/49 144/353 |
| 6,134,750 A * | 10/2000 | Salice | .................... | E05D 7/0407 16/238 |
| 7,419,343 B2 * | 9/2008 | Nagayama | ............. | F16B 37/048 411/176 |
| 7,938,608 B1 * | 5/2011 | Jordan | ..................... | F16B 43/00 411/183 |

* cited by examiner

*Primary Examiner* — Gary Estremsky
(74) *Attorney, Agent, or Firm* — Banner & Witcoff, Ltd.

(57) ABSTRACT

A screw plate panel arrangement for the connection of articles, such as hinges, to a moveable panel. The screw plate is connected to the panel in a single one step molding process that mechanically fastens and imbeds the screw plate into the finished panel.

18 Claims, 4 Drawing Sheets

LOAD FLOOR SCREW PLATE (LFSP) USED TO DISTRIBUTE HINGE AND BRACKET LOADS TO THE LOAD FLOOR PANELS

CROSS-REFERENCE TO RELATED APPLICATIONS

This application claims the benefit of U.S. Provisional Application No. 61/909,514, filed Nov. 27, 2013.

FIELD OF THE INVENTION

The present invention relates to a screw plate and screw plate panel arrangement for the connection of hinges to movable panels in motor vehicles.

BACKGROUND OF THE INVENTION

In the field of automotive design, there have been developments that increase or provide additional compartments within the interior and exterior of the vehicle body, which are enclosed using a door or panel. Typically, the door or panel is connected to the vehicle body in a pivotable manner that uses a hinge. To connect the hinge to the panel, the panel must be pre-drilled after it is produced. Often the panels are produced using various molding techniques and a final layer, such as carpeting or a decorative skin is wrapped around or formed onto the panel. Screw holes are then drilled through the panel and the hinge is connected using traditional fasteners such as a T-nut connected to the pre-drilled holes. One of the problems that can occur is that the holes are not drilled at the appropriate locations. Another problem encountered involves the T-nut being connected with too much torque causing the T-nut to strip the drill hole in the panel. In both instances, the panel is then useless and must be discarded. Thus, there is a need to have a better arrangement for connecting the hinges to their respective panels. There is further a need to reduce the number of holes or fasteners that are needed in order to connect a hinge. There is also a need to reduce the weight by reducing the size of the hinge components and the thickness of the door or panel used to cover the compartment in the vehicle body.

SUMMARY OF THE INVENTION

The present invention is directed to a screw plate and panel arrangement for an automotive interior or exterior application. One particular application of the invention involves a panel arrangement for covering a compartment formed in the vehicle body. For example, an interior floor compartment or an exterior tailgate compartment. A particular screw plate and panel arrangement of the present invention allows for the attachment of articles such as hinges to the panel at locations of varying thickness. The panel in one embodiment of the invention has a first at least one depression having a first depth and a second at least one depression having a second depth different from the first depth. The depth corresponds to a varying thickness of the panel in a region of the respective depressions. The screw plate and panel arrangement further include two or more screw plates having a body, one or more screw extrusions and one or more rosebud features. Each individual one of the two or more screw plates is attached to one of the first at least one depression or one of the second at least one depression. Once the screw plate is connected to its respective depression, at least one article is connected to each one of the two or more screw plates using the screw extrusion formed on the respective two or more screw plates. The article can be a hinge plate, seat bracket, or accessory bracket.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application or uses.

Figure 1:
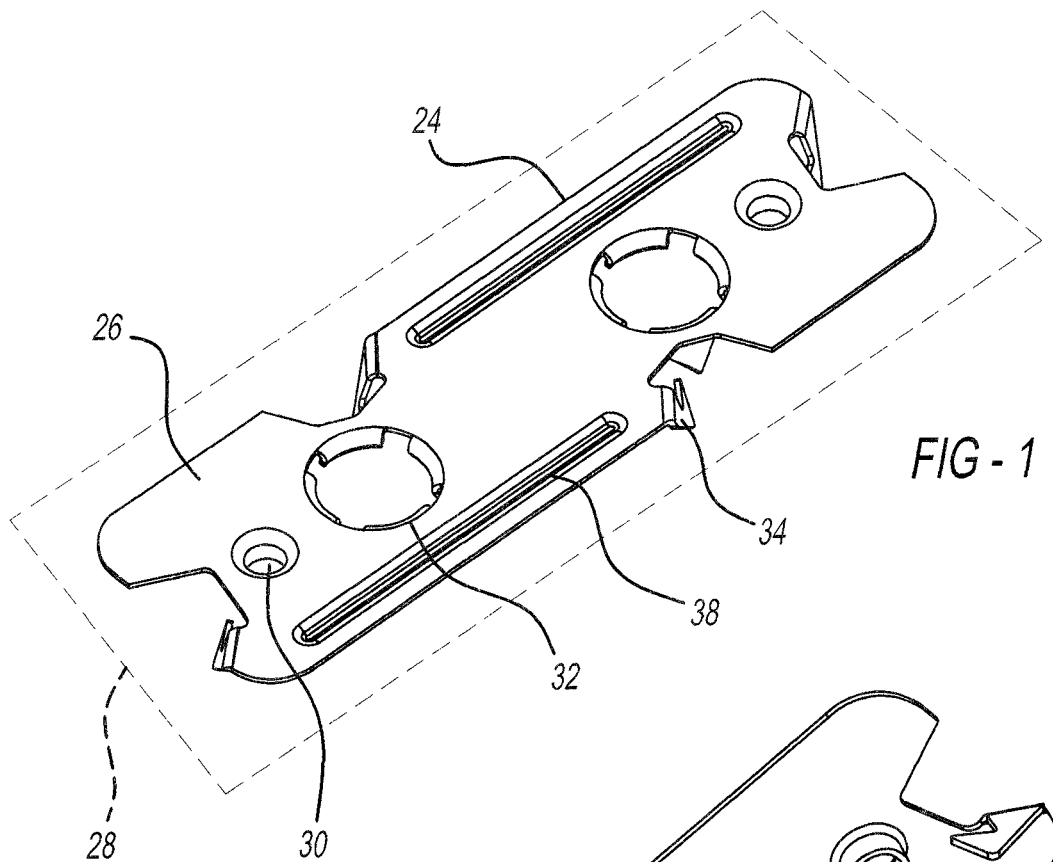
FIG. 1 is an angled top perspective view of a screw plate in accordance with a first embodiment of the invention.
Figure 2:
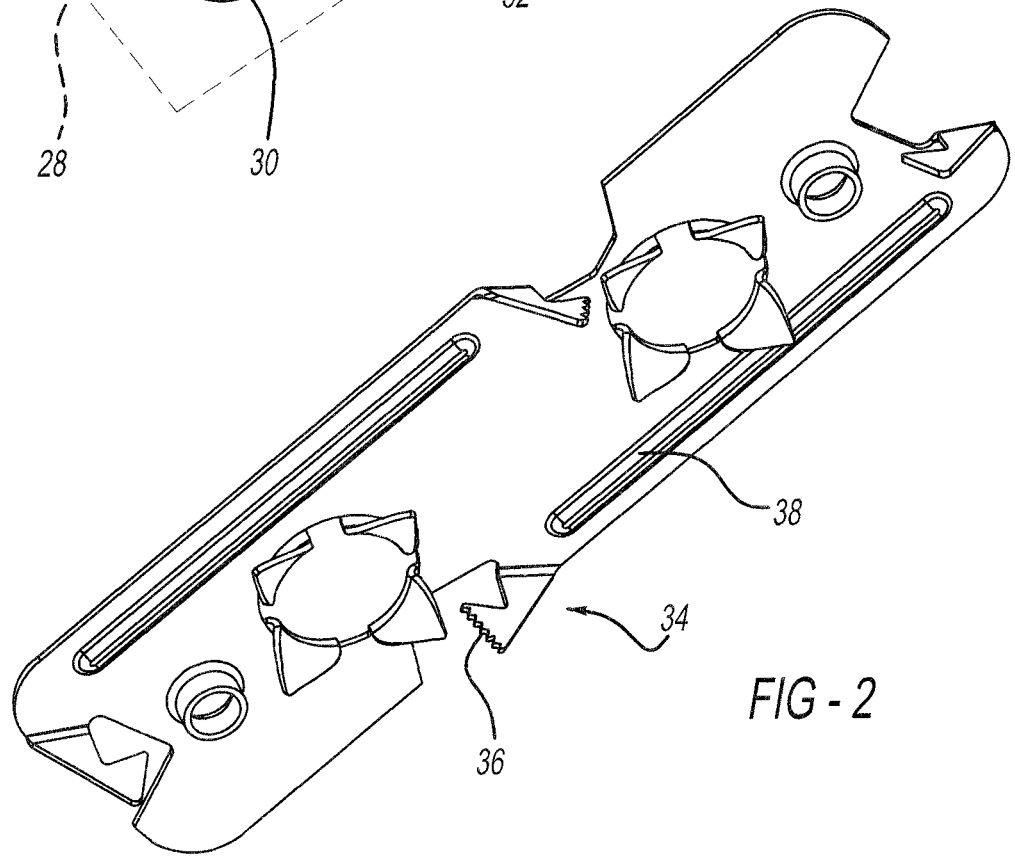
FIG. 2 is an angled bottom perspective view of the screw plate of FIG. 1.
Figure 3:
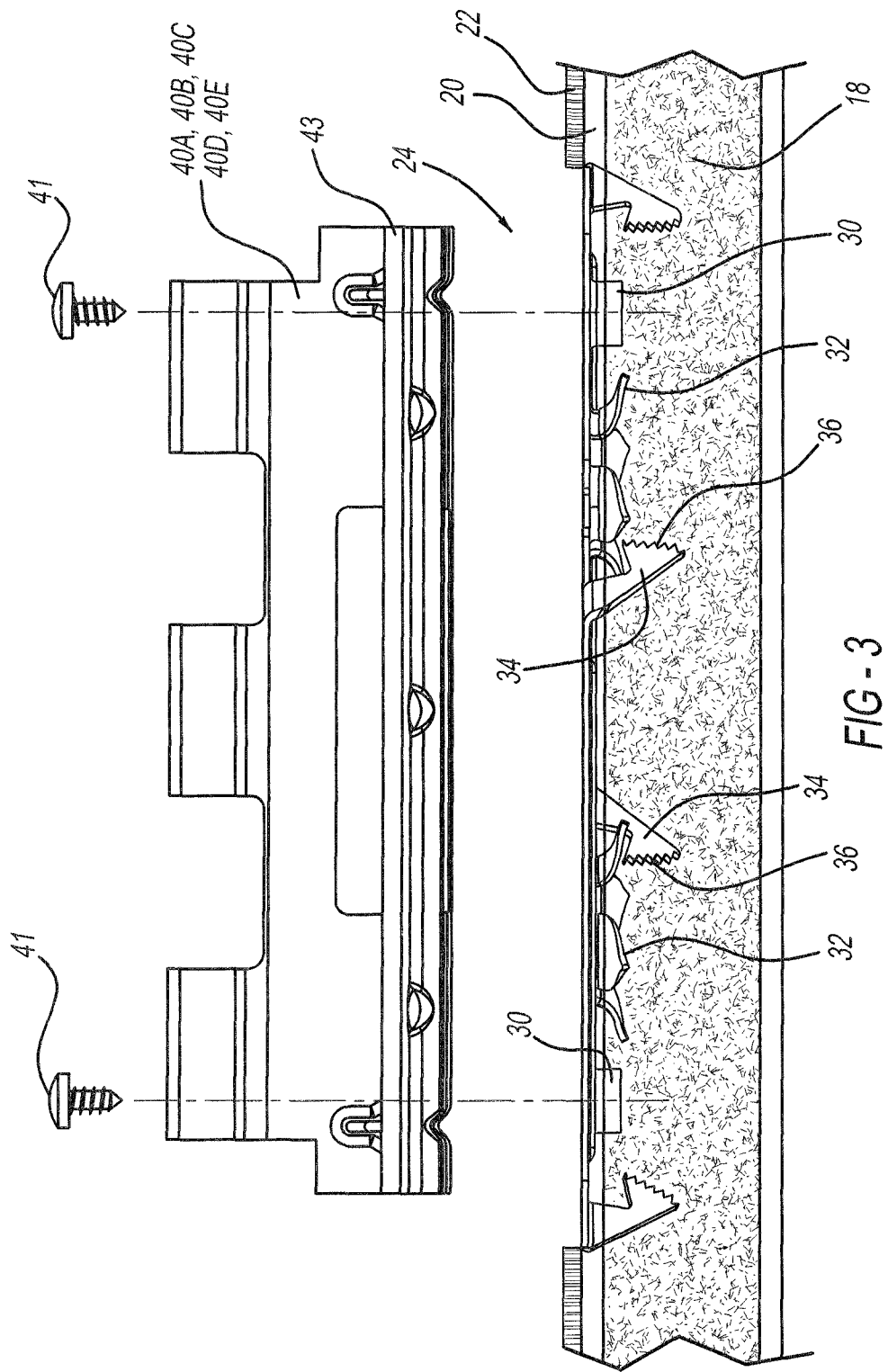
FIG. 3 is a cross sectional partially exploded view of the screw plate and panel arrangement.
Figure 4:
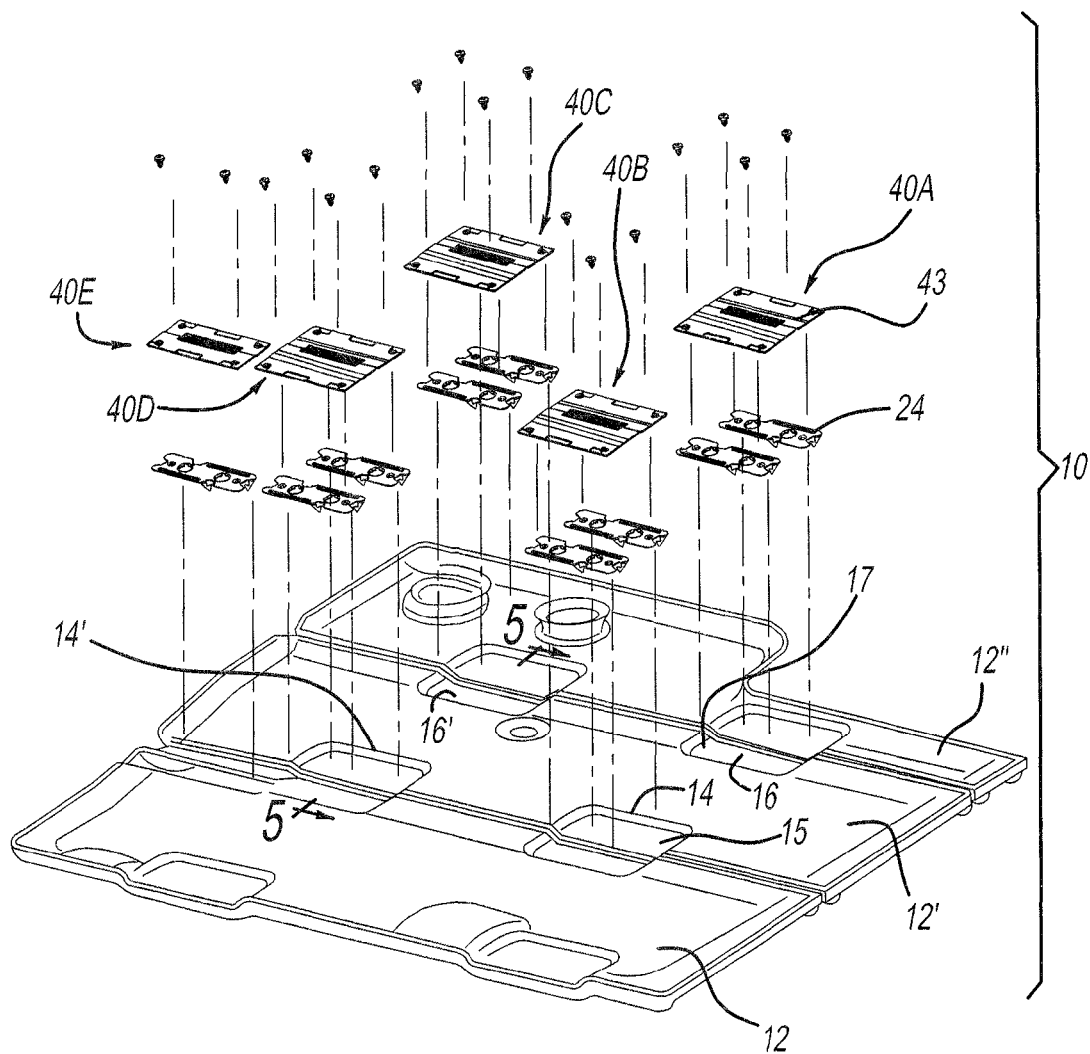
FIG. 4 is a side exploded perspective view of the screw plate and panel arrangement in accordance with another aspect of the invention.
Figure 5:
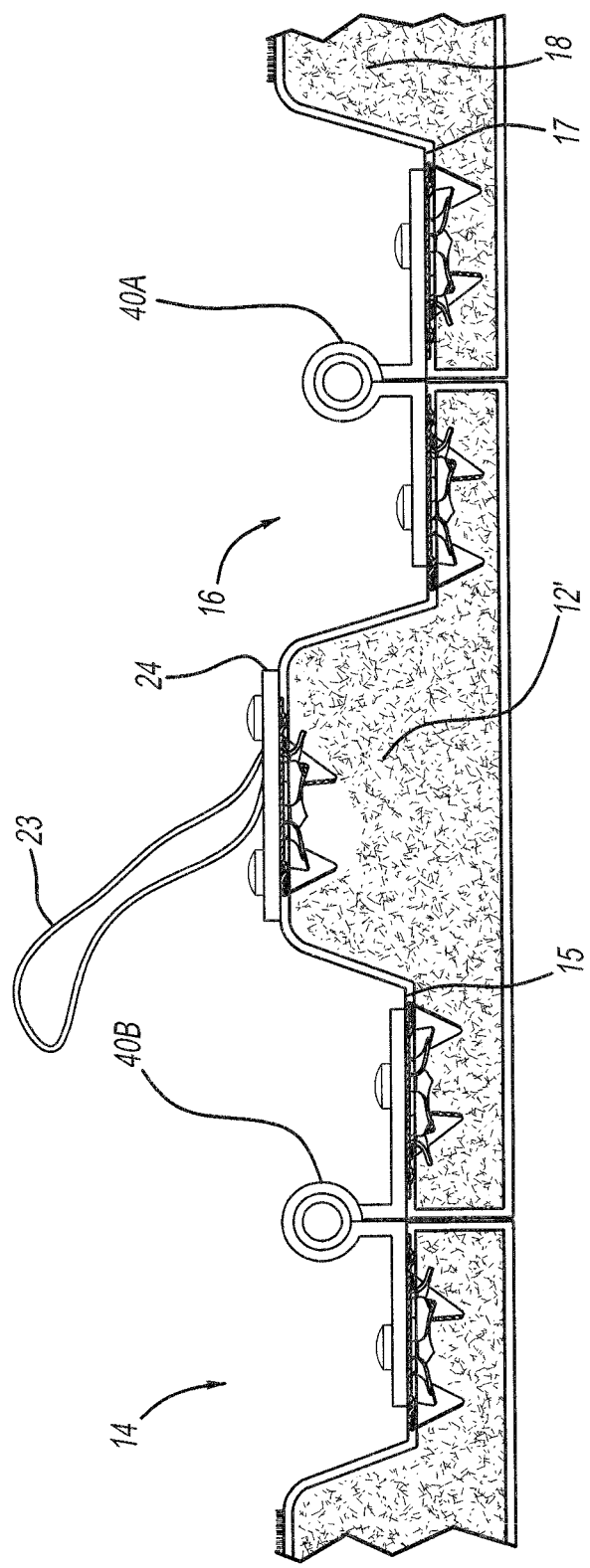
FIG. 5 is a cross-sectional side view of the screw plate and panel arrangement showing multiple hinges connected.

Referring now to all of the Figures, a screw plate arrangement 10 is shown having a three panels 12, 12', 12", wherein one of the panels 12' has a first at least one depression 14, 14' having a depth 15 and a second at least one depression 16, 16' having a depth 17. FIG. 5 shows how the depth 15 is different or less than the depth 17 in order to accommodate for different movements of the three panels 12, 12', 12" relative to each other when the three panels 12, 12', 12" are pivotally connected to each other by an article, such as a hinge. The embodiment shown in FIG. 3 shows three separate panels with one of the panels having different depression; however, it is within the scope of this invention for a greater or lesser number of panels to be used wherein the panel may have any number of depressions depending on the number of articles or hinges to be attached. It is further within the scope of the invention for no depressions to be present and it is also within the scope of the invention for some embodiments to only have a single panel. Each of the panels, 12, 12', 12" in the embodiment shown in FIG. 3 has a hollow core 18 which can be a type of hollow cardboard or other corrugated structure with an outer fiber mat layer 20 that has polyurethane applied to the fiber mat layer 20 during the formation of the panel 12, 12', 12". Typically, the panel 12, 12', 12" is created using a compression molding process wherein the core 18 is placed within the mold and polyurethane is introduced to the fiber mat layer 20. Additionally, where the panel is used in connection with an automotive interior floor application, a layer of carpet 22 is applied over the fiber mat layer 20 in order to create a finished part.

The screw plate panel arrangement 10 further includes a screw plate 24 having a body 26 with a plane of the body 28. Formed through the body 26 are one or more screw extrusions 30 and one or more rosebud features 32. The screw extrusions 30 are used for connecting an article to the panel, while the one or more rosebud features 32 are used for mechanically fixing the screw plate 24 to the panel 12, 12', 12" at a specified location. The screw plate 24 also has one or more hooks 34 which may optionally include a serrated edge 36 for assisting in cutting through or into the carpet, fiber mat layer 20 and core 18. The one or more hooks 34 extend generally perpendicular to the plane of the body 28 so that the one or more hooks 34 extend into the panel 12, 12', 12" when the screw plate 24 is connected to the panel 12, 12', 12". The body 26 of the screw plate 24 also has one or more longitudinal beads 38 that extend generally parallel to the plane 28 of the body 26 and serve the function of adding strength to the body 26 and preventing the body 26 from bending during assembly.

The screw plate 24 is used for connecting an article 40, such as a hinge, for connecting together multiple panels or connecting the panel to the vehicle body. Additionally, the screw plate 24 can be used for connecting other articles such as a seat mounting post, an arm rest, a glove compartment, body or glove compartment door, or any other article that needs to be connected to a panel as described herein. In the particular embodiment shown in the drawings, the article 40 is a hinge that is connected using fasteners 41 that extend through holes in a base plate 43 of the hinge 40 and into the one or more screw extrusions 30. FIG. 5 shows another additional alternate embodiment of the invention, where an additional screw plate 24 is used to connect a pull strap 23 for pulling the panels of the invention. It is within the scope of this invention for the screw plate 24 to have any number of screw extrusions depending on the size of the screw plate 24 and the number of fasteners or screws to be connected to the screw plate 24. It is also within the scope of this invention for any number of rosebud features or hooks or longitudinal beads to be used depending upon the size of the body 26 of the screw plate. For example, a longer or wider body 26 would require more hooks, longitudinal beads or rosebud features in order to properly connect the screw plate 24 to its respective panel.

The screw plate arrangement 10 solves the need to use T-nuts or predrilled finished panels and allows for the screw plate 24 to be connected to its respective panel 12, 12', 12" during the molding process. The present embodiment of the invention utilizes a compression molding process wherein a tool is placed in the open position and the core 18 is loaded into the tool. The screw plate 24 is connected to the body of the molding tool using magnets at the appropriate location. Referring briefly to FIG. 3, the panels 12, 12', 12" have at least a first and second depression that has a varying degree of thickness. The screw plate 24 is configured to be connected to those specific depressions during the molding process. When polyurethane is applied to the fiber mat layer 20, the tool is subsequently closed and the screw plates are connected to the core 18 by both mechanical and polymeric bonds. The one or more hooks 34 and one or more rosebud features 30 pierce the polyurethane fiber mat layer 20 and the polyurethane material forms around the rosebud feature and hooks. The one or more hooks 34 each optionally include a serrated edge 36 that aids in the engagement of the screw plate 24 to the core 18. The use of the screw plate 24 and the screw plate arrangement allows for the screw plate 24 to be connected in areas of varying depth 15, 17 or thickness of the panel 12, 12', 12" which allows for saving material or allowing a flush mounting of the article 40 to the panel 12, 12', 12". However, it is not completely necessary that the screw plate 24 be connected to a region of a panel 12, 12', 12" that has a depression. It is possible for the screw plate 24 to be connected to a flat surface without any depth.

After the screw plate 24 is compressed onto the panel using the compression molding process, a carpet layer 22 or some other finishing layer may be applied over the core 18 and screw plate 24. Since it is known where the one or more screw extrusions 30 are located on the screw plate 24, an article can be mechanically aligned and connected to the panel with suitable fasteners. The present invention eliminates the need for any type of drilling of the panel 12, 12', 12", which can destroy the molded panel and create waste.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A screw plate panel arrangement comprising:
   a panel having;
   one or more screw plates having a body, one or more screw extrusions and one or more rosebud features, wherein said one or more screw plates is attached to a surface of the panel having at least one depression using said one or more rosebud features;
   one or more hooks formed on the surface of the body of each said one or more screw plates, wherein said one or more hooks extend away from a plane of said body; and
   an article connected to said or more screw plates.

2. The screw plate panel arrangement of claim 1 wherein each of said one or more hooks has a serrated edge.

3. The screw plate panel arrangement of claim 1 further comprising one or more longitudinal beads extending along a portion of said body of said one or more screw plates, wherein said one or more longitudinal beads add strength to said body to prevent said body from bending.

4. The screw plate panel arrangement of claim 1, wherein said article is a portion of a hinge.

5. The screw plate panel arrangement of claim 1, wherein said article includes one selected from the group consisting of a seat mounting post, an arm rest, pull strap, a glove compartment, body or glove compartment door.

6. The screw plate panel arrangement of claim 1, wherein said panel is part of an automotive interior floor application.

7. The screw plate panel arrangement of claim 6, wherein said panel further comprises a layer of carpet applied on the outer surface of said panel.

8. The screw plate panel arrangement of claim 1, wherein said panel further comprises a hollow core with an outer fiber mat layer connected to said hollow core.

9. The screw plate panel arrangement of claim 1 further comprising one or more fasteners connected to the panel through each one of the one or more screw extrusions.

10. A screw plate comprising:
    a body
    one or more screw extrusions formed through said body;
    one or more rosebud features; and
    one or more hooks formed on the surface of said body, wherein said one or more hooks extend away from a plane of said body.

11. The screw plate of claim 10 further comprising one or more longitudinal beads extending along a portion of said body, wherein said one or more longitudinal beads add strength to said body to prevent said body from bending.

12. The screw plate of claim 10, wherein said one or more hooks has a serrated edge.

13. The screw plate of claim 10 further comprising one or more fasteners threadably connected to the one or more screw extrusions.

14. A screw plate panel arrangement comprising:
a first panel and a second panel;
two or more screw plates having a body, one or more screw extrusions and one or more rosebud features, wherein a first one of said two or more screw plates is attached said first panel and a second one of said two or more screw plates is attached to said second panel;
one or more hooks formed on the surface of the body of each of said two or more screw plates, wherein said one or more hooks extend away from a plane of said body; and
an article connected between each one of said two or more screw plates, wherein said article connects between said first panel and said second panel.

15. The screw plate panel arrangement of claim 14 wherein each of said one or more hooks has a serrated edge.

16. The screw plate panel arrangement of claim 14 further comprising one or more longitudinal beads extending along a portion of said body of each of said two or more screw plates, wherein said one or more longitudinal beads add strength to said body to prevent said body from bending.

17. The screw plate panel arrangement of claim 14, wherein said article is a portion of a hinge.

18. The screw plate panel arrangement of claim 14, wherein said article includes one selected from the group consisting of a seat mounting post, an arm rest, a glove compartment, body or glove compartment door or a pull strap.

* * * * *